United States Patent
Pandey

(10) Patent No.: US 10,567,179 B1
(45) Date of Patent: Feb. 18, 2020

(54) NETWORK DEVICE AND METHOD FOR PERFORMING NETWORK OPERATIONS IN A COMMUNICATIONS NETWORK

(71) Applicant: NXP B.V., Eindhoven (NL)

(72) Inventor: Sujan Pandey, Waalre (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/119,964

(22) Filed: Aug. 31, 2018

(51) Int. Cl.
*H04J 3/16* (2006.01)
*H04L 12/12* (2006.01)
*H04L 29/08* (2006.01)
*H04L 12/40* (2006.01)

(52) U.S. Cl.
CPC ........ *H04L 12/12* (2013.01); *H04L 12/40039* (2013.01); *H04L 69/323* (2013.01); *H04L 2012/40273* (2013.01)

(58) Field of Classification Search
CPC ............... H04L 25/03; H04L 25/03191; H04L 25/03885
USPC ........................................ 370/437, 465, 479
See application file for complete search history.

(56) References Cited

U.S. PATENT DOCUMENTS

| | | | |
|---|---|---|---|
| 6,804,792 B2* | 10/2004 | Nishikawa | G06F 1/3203 713/323 |
| 7,643,439 B2* | 1/2010 | Kochman | H04W 52/0261 370/311 |
| 7,738,567 B2* | 6/2010 | Miller | H04L 25/063 370/286 |
| 7,961,817 B2* | 6/2011 | Dong | H04L 25/06 327/307 |
| 8,135,972 B2* | 3/2012 | Olsson | H04L 12/12 713/324 |
| 8,219,156 B2* | 7/2012 | Liu | H04W 52/0241 455/574 |
| 8,320,435 B2* | 11/2012 | Zukunft | H04L 12/10 375/222 |
| 8,526,823 B2* | 9/2013 | Swanson | H04B 10/0795 398/136 |
| 8,861,371 B2* | 10/2014 | Krzanowski | H04L 41/0213 370/225 |
| 8,982,710 B2* | 3/2015 | Meilik | H04L 43/0811 370/241.1 |
| 8,984,304 B2* | 3/2015 | Zimmerman | G06F 1/3203 713/300 |
| 9,106,435 B2* | 8/2015 | Matheney | H04L 12/2801 |
| 9,143,306 B2* | 9/2015 | Pandey | H04L 5/1423 |
| 9,531,569 B2* | 12/2016 | Berke | H04L 25/03057 |
| 9,787,607 B2* | 10/2017 | Bumstead | H04L 49/351 |
| 10,116,462 B2* | 10/2018 | Balbierer | H04L 12/40136 |
| 10,148,467 B2* | 12/2018 | Pandey | H04B 1/3822 |

(Continued)

*Primary Examiner* — Dmitry Levitan
(74) *Attorney, Agent, or Firm* — Rajeev Madnawat

(57) ABSTRACT

Embodiments of a method and a device are disclosed. A method for performing operations in a communications network is disclosed. The method involves, determining, at a first network node in a communications network, that a DSP of a receiver of a network node in the communications network can operate at a reduced functionality level, and communicating the determination from the first network node to a second network node in the communications network in a protocol data unit (PDU), wherein the DSP of a receiver of a network node that can operate at a reduced functionality level is a DSP of a receiver of one of the first network node and the second network node.

16 Claims, 13 Drawing Sheets

(56) References Cited

U.S. PATENT DOCUMENTS

2010/0023658 A1* 1/2010 Diab ................. H04L 12/40039
   710/59
2012/0287829 A1* 11/2012 Chang ...................... H04L 5/16
   370/296
2018/0255350 A1* 9/2018 Rumreich ........ H04N 21/26258

* cited by examiner

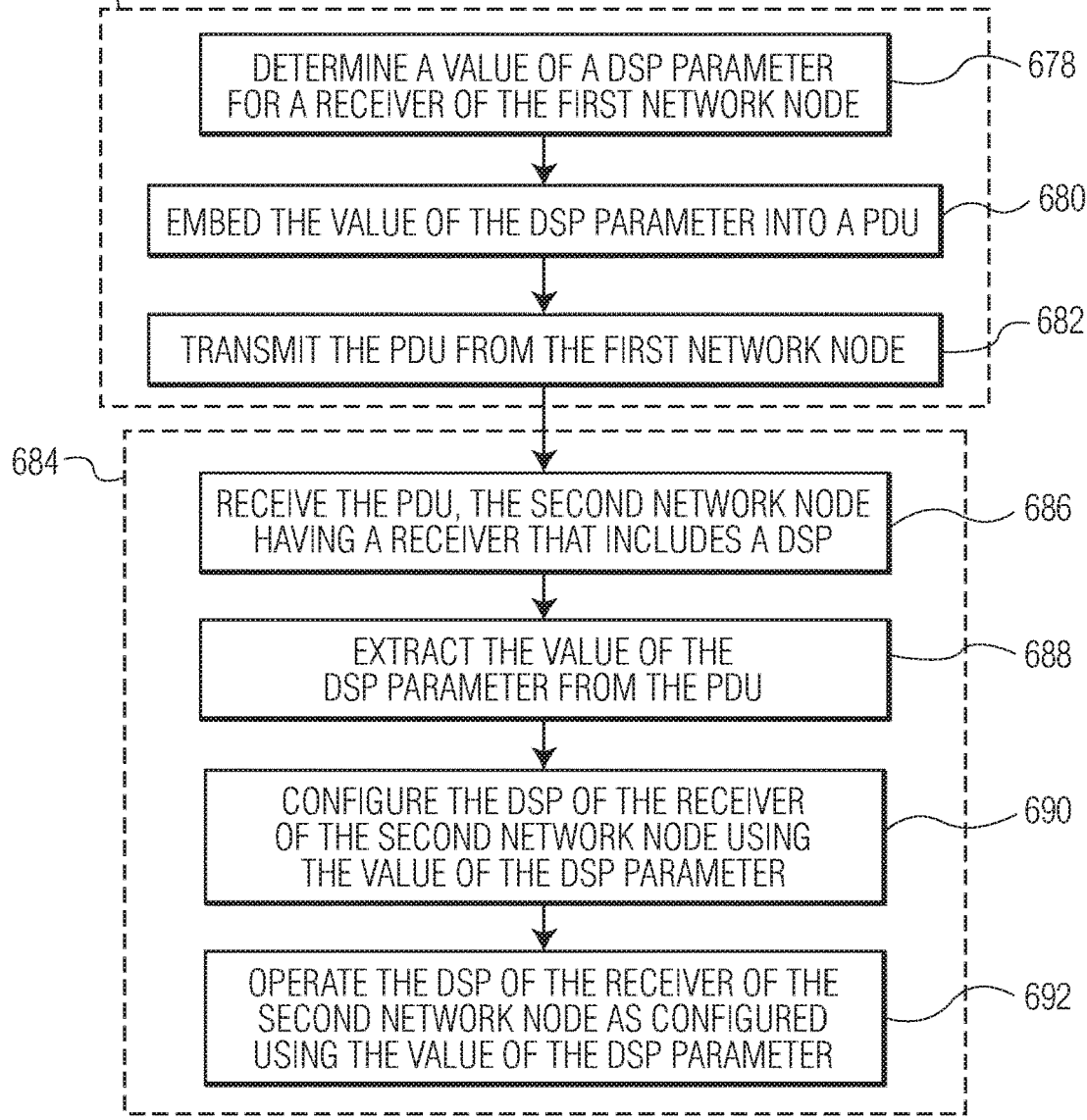

NETWORK DEVICE AND METHOD FOR PERFORMING NETWORK OPERATIONS IN A COMMUNICATIONS NETWORK

BACKGROUND

Modern automobiles include various electronic control units (ECUs) that implement, for example, engine control, power train control, airbag systems, antilock brake systems, cruise control, electric power steering, audio systems, window control systems, door control systems, mirror adjustment systems, and battery and recharging systems for hybrid/electric cars. The ECUs communicate with each other in an automobile via in-vehicle network (IVN) technologies such as Ethernet, Controller Area Network (CAN), and FlexRay. As electric powered automobiles become more popular, it is important that ECUs operate efficiently in terms of, for example, energy consumption and heat generation.

SUMMARY

Embodiments of a method and a device are disclosed. A method for performing operations in a communications network is disclosed. The method involves determining, at a first network node in a communications network, that a DSP of a receiver of a network node in the communications network can operate at a reduced functionality level, and communicating the determination from the first network node to a second network node in the communications network in a protocol data unit (PDU), wherein the DSP of a receiver of a network node that can operate at a reduced functionality level is a DSP of a receiver of one of the first network node and the second network node.

In an embodiment, the receiver of the first network node and the receiver of the second network node are capable of receiving data at the same maximum data rate.

In an embodiment, the method involves reducing the functionality level of a DSP at one of the first network node and the second network node after communicating the determination from the first network node to the second network node in the communications network.

In an embodiment, reducing the functionality level of the DSP involves disabling a digital processing block of the DSP.

In an embodiment, communicating the determination from the first network node to the second network node involves embedding an operations, administration, and management (OAM) word into a payload field of the PDU.

In an embodiment, the method involves determining a value of a digital signal processor (DSP) parameter for a receiver, embedding the value of the DSP parameter into a PDU, and transmitting the PDU on the communications network.

In an embodiment, the method involves receiving the PDU, extracting the value of the DSP parameter from the PDU, configuring a DSP of a receiver using the value of the DSP parameter, and operating the DSP of the receiver as configured using the value of the DSP parameter.

In an embodiment, embedding the value of the DSP parameter into a PDU involves embedding the value of the DSP parameter into a header field of the PDU.

In an embodiment, the method involves embedding an OAM word into a payload field of the PDU to communicate information related to the value of the DSP parameter.

In an embodiment, the method involves embedding the OAM word into the PDU at a physical coding sublayer transmitter (PCS-TX) of the first network node and receiving the OAM word at the second network node and extracting the OAM word from the PDU at a physical coding sublayer receiver (PCS-RX) of the second network node.

In an embodiment, the method involves determining a value of a DSP parameter and embedding the value of the DSP parameter into a PDU.

In an embodiment, embedding the value of the DSP parameter into the PDU involves embedding the value of the DSP parameter into a header field of the PDU.

In an embodiment, determining a value of a DSP parameter involves computing a value of at least one of an equalizer setting, an echo canceller setting, a clock data recovery (CDR) setting, an automatic gain control (AGC) setting, and a digital baseline wander (BLW) setting.

In an embodiment, determining a value of a DSP parameter involves reading a register value of the DSP.

In an embodiment, the method involves embedding an operations, administration, and management (OAM) word into a payload field of a PDU to communicate information related to the value of the DSP parameter.

In an embodiment, the method involves inserting the OAM word into the PDU at a physical coding sublayer transmitter (PCS-TX) of the first network node.

A physical layer (PHY) device for a communications network is also disclosed. The PHY device includes a transmitter, a receiver that includes a DSP, and control logic configured to determine that a DSP of a receiver of a first network node in the communications network can operate at a reduced functionality level and to communicate the determination to a second network node in the communications network in a PDU, wherein the DSP of a receiver of a network node that can operate at a reduced functionality level is a DSP of a receiver of one of the first network node and the second network node.

In an embodiment, the PHY device includes DSP parameter compute logic configured to determine a value of a DSP parameter for operating the DSP of the receiver, and DSP parameter reuse logic configured to program the DSP with a value of a DSP parameter.

In an embodiment, the transmitter is configured to embed the value of the DSP parameter into a header of a PDU and to embed an OAM word into a PDU, wherein the OAM word included information related to the value of the DSP parameter, and the receiver is configured to extract a value of the DSP parameter from a header of a PDU and to extract an OAM word from a PDU, wherein the OAM word included information related to the value of the DSP parameter.

In an embodiment, the DSP parameter compute logic is configured to compute a value of at least one of an equalizer setting, an echo canceller setting, a CDR setting, an AGC setting, and a BLW setting.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6A is a process flow diagram of a method for performing physical layer operations in a communications network.

FIG. 6B is a process flow diagram of another method for performing physical layer operations in a communications network.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
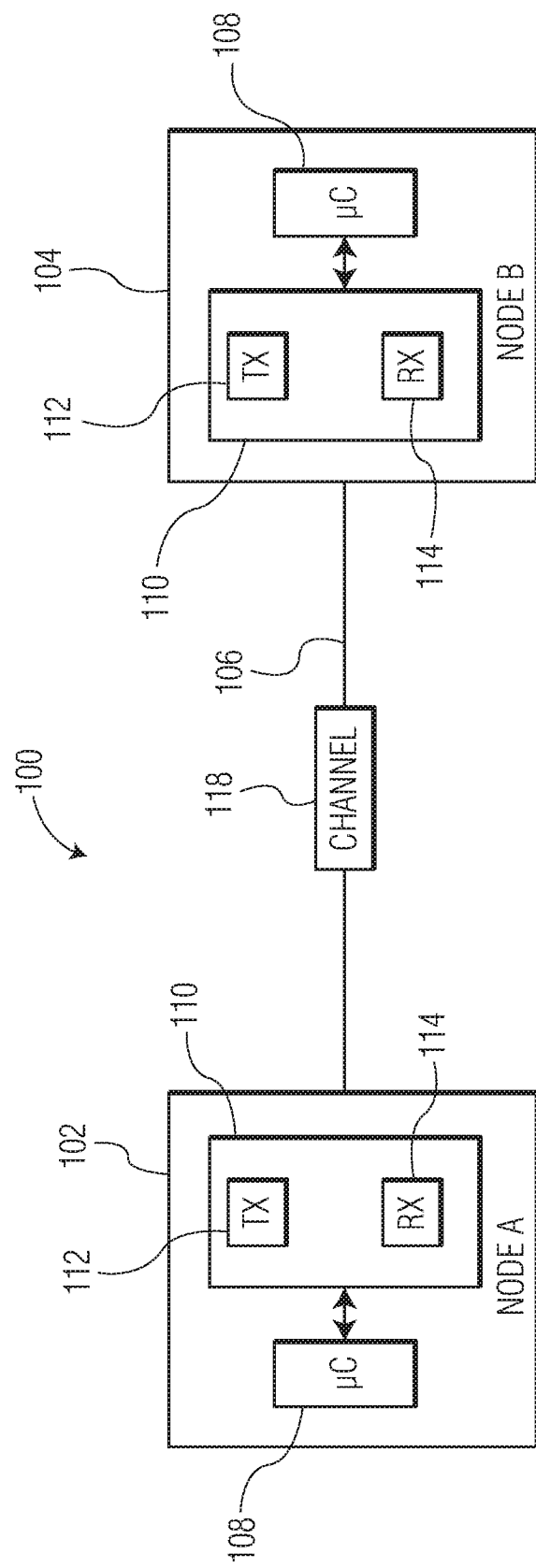
FIG. 1 depicts a communications network that connects two nodes via a communications medium.

FIG. 1 depicts a communications network 100 that connects two nodes, node A 102 and node B 104, via a communications medium 106 such as an unshielded twisted pair of copper wires, e.g., 10BASE-T1L. In an embodiment, the network is an in-vehicle network (IVN) that uses Ethernet at the data link layer, as specified in the Open Systems Interconnection (OSI) model as published by the International Organization for Standardization (ISO). Each node includes a microcontroller 108 and a transceiver 110 that includes a transmitter 112 and a receiver 114. Data is communicated in a channel 118 across the communications medium 106. In an embodiment, a channel may be a logical channel that is specified at a layer higher than the physical layer. As used herein, a link or a communications link refers to a communications pathway that is supported by the communications medium, such as twisted pair wires or a single conductor based coax cable, and various communications protocols that are implemented at different layers in the OSI mode to achieve successful data communications between two or more nodes. Although FIG. 1 shows only two nodes in the communications network, the communications network may include more than two nodes. In general, high speed Ethernet (e.g., greater than 10 Mbits/s) uses point-to-point network configurations but there are network configurations that involve point-to-multipoint. The techniques described herein are applicable to point-to-point and point-to-multipoint network configurations. Further, although in some embodiments an Ethernet-based network is described, it should be noted that the invention is not restricted to a specific type of network. The communications network may be, for example, an in-vehicle network (IVN) that utilizes a network technology such as Controller Area Network (CAN), Local Interconnect Network (LIN), Media Oriented Systems Transport (MOST), or FlexRay™. The communications network can be used to enable communications between, for example, various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more.

In some embodiments, the microcontrollers 108 are connected to at least one device (not shown) such as a sensor, an actuator, or some other control device and are programmed to determine the meaning of received messages and to generate appropriate outgoing messages. In some embodiments, at least one of the microcontrollers includes a host (not shown), which may include, for example, a software application that is stored in memory of the microcontroller and executed by processing circuits of the microcontroller. The microcontrollers, also referred to as host processors, hosts, or digital signal processors (DSPs), are known in the field. In an embodiment, the microcontrollers 108 implement data link layer (i.e., Layer 2) operations as is known in the field, which in an Ethernet-based network may include Logical Link Control (LLC) sublayer operations and/or media access control (MAC) sublayer operations. For example, in a receive operation, a microcontroller stores received serial bits from a corresponding transceiver 110. In a transmit operation, the microcontroller may transmit a message as serial bits in a data frame format to the corresponding transceiver. The microcontrollers may be implemented as, for example, digital signal processors (DSPs) and/or central processing units (CPUs).

The transceivers 110 are located between the microcontrollers 108 and the communications medium 106 and implement physical layer operations. For example, in receive operations, the receivers 114 convert analog signals from the communications medium to digital signals that a corresponding microcontroller can interpret. In an embodiment, the receivers 114 include a DSP to process incoming signals. The transceiver also can protect the microcontroller from extreme electrical conditions on the communications medium, e.g., electrical surges. In transmit operations, the transmitters 112 convert digital bits received from the microcontroller into analog signals that are sent on the communications medium. The transceivers may be any suitable type of transceivers. In some embodiments, the transceivers are Ethernet transceivers. For example, the transceivers may be Institute of Electrical and Electronics Engineers (IEEE) 802.3 compatible Ethernet transceivers. The transceivers may be implemented in suitable analog circuits and/or digital circuits.

In the communications network 100 depicted in FIG. 1, the nodes 102 and 104 are connected to the communications medium 106, which carries analog signals between the communications devices. The communications medium may include one or more conductive wires or lines, which are made of conductive materials (e.g., metals). For example, the communications medium may include one or more coaxial cables, twisted pair cables, or fiber optic cables. In some embodiments, the communications medium includes a communications bus, which carries analog differential signals and includes a high bus line and a low bus line, which may be connected between one or more resistors. However, the network topology of the communications network is not limited to bus topology. Examples of the network topology that can also be used by the communications network includes point-to-point, star, ring or circular, mesh, tree, hybrid, and daisy chain, which are known in the field.

Figure 2:
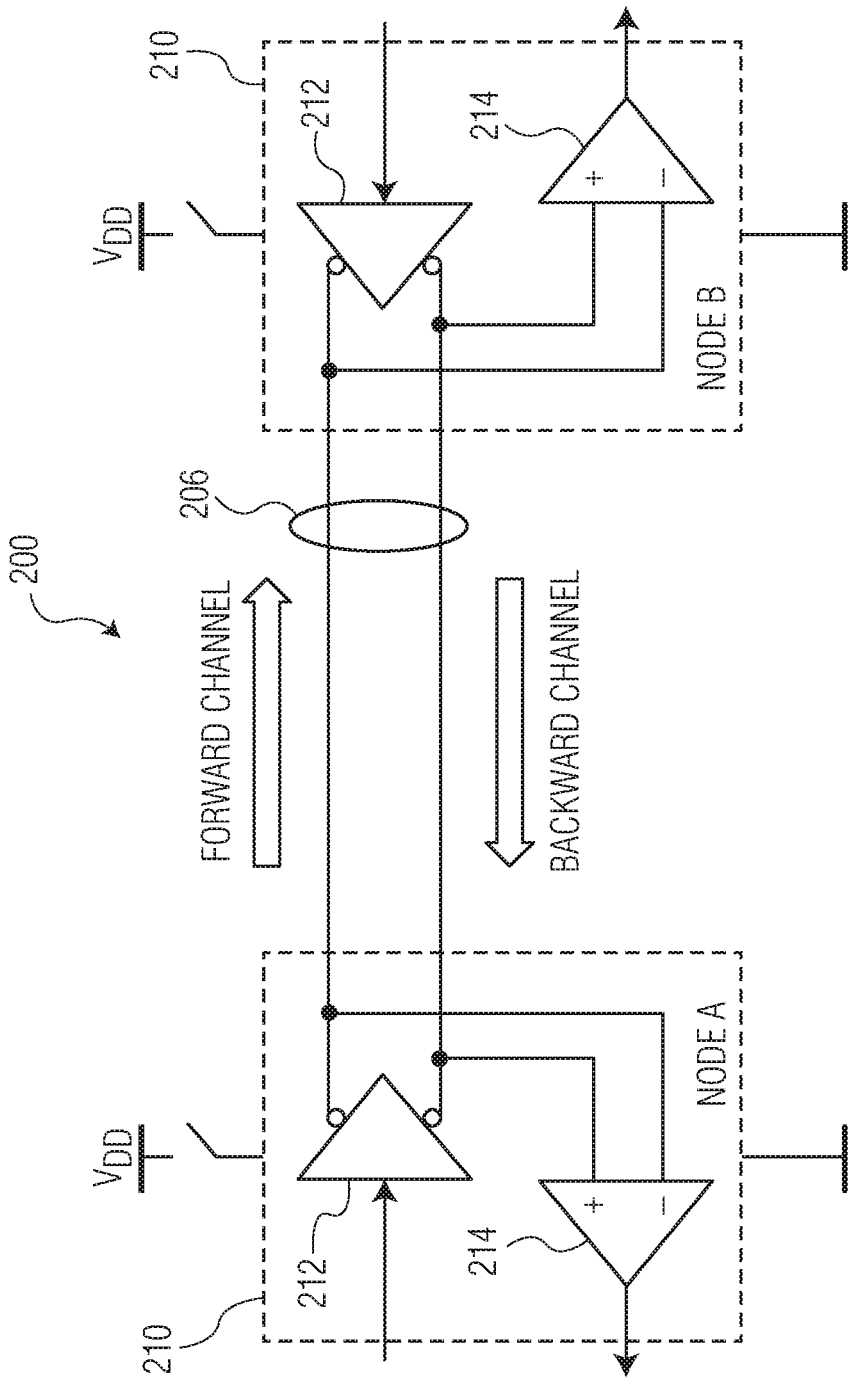
FIG. 2 depicts an embodiment of a point-to-point communications network that includes an expanded view of the transceivers shown in FIG. 1.

FIG. 2 depicts an embodiment of a point-to-point communications network 200 that includes an expanded view of the transceivers 210 shown in FIG. 1. As shown in FIG. 2, the transceivers 210 include the transmitters 212 and the receivers 214, which are connected to each other by the communications medium 206, e.g., twisted pair wires. Although not shown in FIG. 2, the receivers 214 each include a DSP that is configured to perform digital processing functions such as, for example, equalizer functions, echo cancellation functions, automatic gain control (AGC) functions, clock data recovery (CDR) functions, baseline wander (BLW) functions, and/or data recovery functions. For example, the DSPs of the receivers may include digital processing blocks configured specifically for equalizer functions, echo cancellation functions, automatic gain control (AGC) functions, clock data recovery (CDR) functions, baseline wander (BLW) functions, and/or data recovery functions. In the example of FIG. 2, the transceivers are configured for duplex communications, that is, communication is possible in both directions. In FIG. 2, from the perspective of the left-side transceiver, the communications channel from the left-side transceiver to the right-side transceiver is referred to as the "forward channel" and the communications channel from the right-side transceiver to the left-side transceiver is referred to as the "backward channel."

Communications between two transceivers with no intervening transceivers, often referred to as "point-to-point" communications, can be characterized as "symmetrical" or "asymmetrical." In symmetrical point-to-point communications, both transceivers transmit and receive data at the same data rate. For example, in an Ethernet-based point-to-point network both transceivers transmit and receive at 10 Gbps. Ethernet-based point-to-point networks are typically symmetrical. In asymmetrical point-to-point communications, communications in one direction, e.g., on the forward channel, occur at a higher rate than in the other direction, e.g., on the backward channel. An example use case for asymmetrical point-to-point communications in an IVN may be a backup camera, where a high data rate is needed from a camera ECU to a control/display ECU (e.g., the forward channel) but a much lower data rate is needed from the control/display ECU to the camera ECU (e.g., the backward channel). IVN protocols such as low voltage differential signaling (LVDS), Automotive Pixel Link (APIX), or Flat Panel Display Link (FPD-Link) may be implemented in IVN use cases that call for duplex asymmetrical communications.

Figure 3:
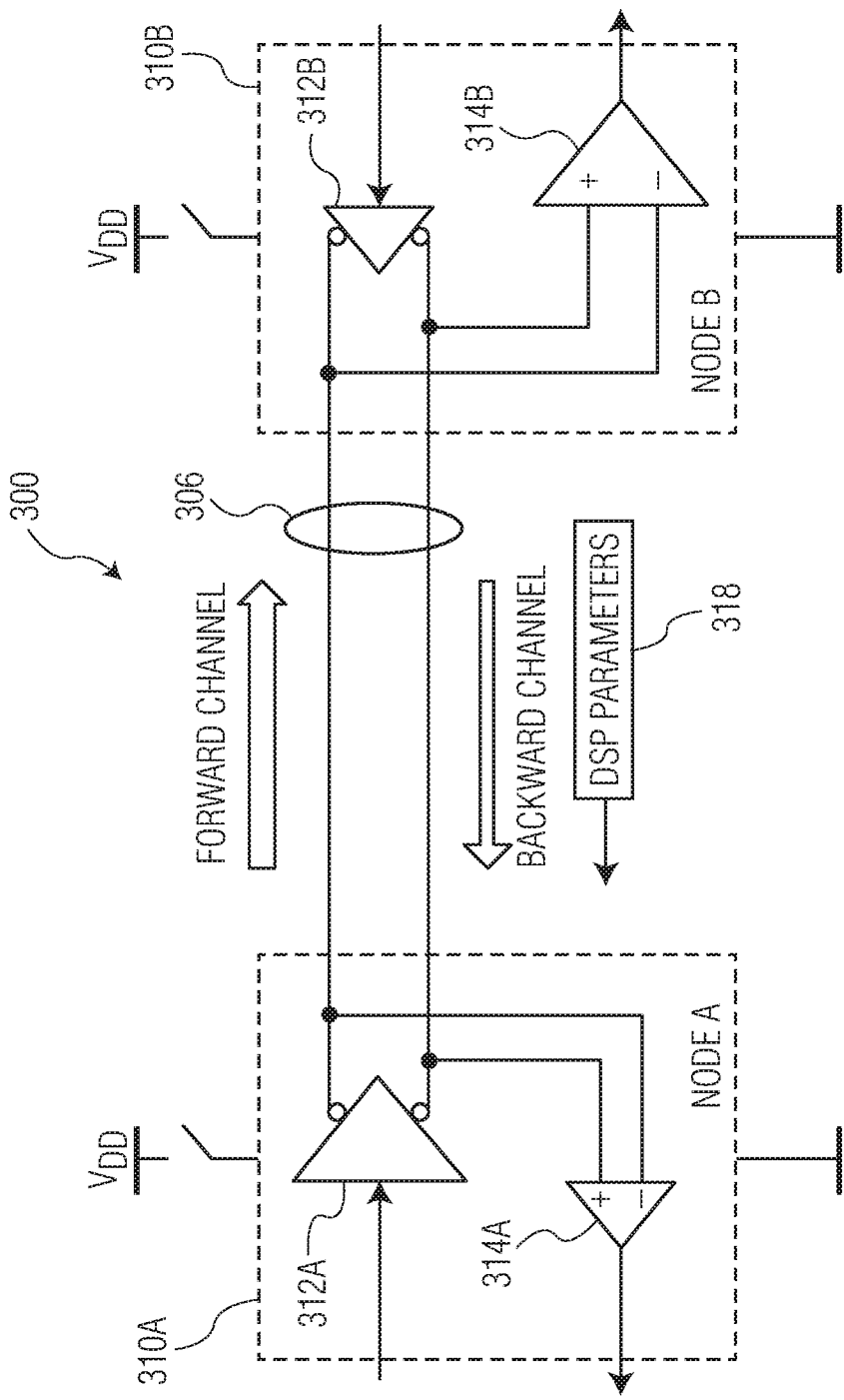
FIG. 3 depicts an example of a point-to-point communications network that is similar to the example described with reference to FIG. 2, in which the transceivers are specifically designed for asymmetrical duplex communications.

FIG. 3 depicts an example of a point-to-point communications network 300 that is similar to the example described with reference to FIG. 2, in which the transceivers 310A and 310B of FIG. 3 are specifically designed for asymmetrical duplex communications. In the example of FIG. 3, the forward channel communicates at a higher data rate than the backward channel, e.g., 10 Gbps on the forward channel and 0.5 Gbps on the backward channel. In the example of FIG. 3, the capability of the transmitters and receivers in terms of data rate is represented by the different relative sizes of the transmitters and receivers. In particular, the transmitter 312A and the receiver 314B, which support the forward channel, are a first size and the transmitter 312B and the receiver 314A, which support the backward channel, are a second, smaller, size.

In an example configuration as shown in FIG. 3, it is often the case that the lower speed receiver, e.g., receiver 314A, is less complex than the higher speed receiver, e.g., receiver 314B. For example, the less complex receiver may include less complex signal processing blocks and/or the scale of the signal processing blocks may be smaller to support a lower data rate. In an embodiment, receiver complexity can be characterized by factors such as: 1) the number of taps of the equalizer and/or echo canceller (e.g., as the data rate increases, the number of taps also increases, which results in a near exponential increase in hardware complexity); 2) a higher data rate typically requires a high sampling clock rate for the analog-to-digital converter (ADC), which requires more silicon area and more power consumption; 3) a higher data rate typically corresponds to a greater susceptibility to noise and interference, which typically requires additionally processing capability to implement error correction; and 4) a higher data rate typically requires more complex digital signal processing blocks to recover data at an acceptable bit error rate.

Even though the lower speed receiver may be less complex than the higher speed receiver, there are some common characteristics between the forward channel and the backward channel that can translate to common characteristics of the receivers. For example, some parameters of the DSPs of the receivers, such as equalizer settings, echo cancellation settings, automatic gain control (AGC) settings, clock data recovery (CDR) settings, baseline wander (BLW) settings, and data recovery settings, may be common (e.g., in the sense that the settings are correlated to each other) to both the higher speed receiver, e.g., receiver 314B, and the lower speed receiver, e.g., receiver 314A. For example, some DSP settings may be correlated to each other as a function of the ratios of different data rates of the receivers, e.g., (10 Gbps/0.5 Gbps)=(X forward channel setting/Y backward channel setting). Conventionally, each receiver computes its own DSP parameters in an "on-chip" process that consumes computational resources, which can translate to power consumption, heat generation, and/or processing delays at each receiver.

In accordance with an embodiment of the invention, a technique for performing physical layer operations in a communications network is disclosed. The technique involves determining a value of a DSP parameter for a receiver at a first network node, embedding the value of the DSP parameter into a protocol data unit (PDU), and transmitting the PDU from the first network node. In an embodiment, the value of the DSP parameter is a value of, for example, an equalizer setting, an echo canceller setting, a clock data recovery (CDR) setting, an automatic gain control (AGC) setting, a digital baseline wander (BLW) setting, and/or filter coefficients. In an embodiment, the value of the DSP parameter is a register value of the DSP that indicates, for example, a state of a DSP block, e.g., disabled or enabled. In an embodiment, the values of DSP parameters may be provided in, for example, binary format or hexadecimal format. In an embodiment, the method may also involve, at a second network node, receiving the PDU, the second network node having a receiver that includes a DSP, extracting the value of the DSP parameter from the PDU, configuring the DSP of the receiver of the second network node using the value of the DSP parameter, and operating the DSP of the receiver of the second network node as configured using the value of the DSP parameter from the first network node. In an embodiment, the receiver of the first network node is configured to receive data at a higher rate than the receiver of the second network node. Because a value of a DSP parameter (or values of multiple different DSP parameters) is computed by one DSP and shared with the other DSP, resources can be conserved at the DSP that receives the shared DSP parameters. Additionally, it may be easier and/or more efficient for the higher rate (e.g., more complex DSP) to compute the values of the DSP parameters and share them with the lower rate (e.g., less complex DSP) to ease the burden on the lower rate DSP. The sharing of DSP parameters can translate to a reduction in power consumption, a reduction in heat generation, and/or a reduction in processing delays.

With reference to the example shown in FIG. 3, values of DSP parameters 318 are computed at the higher speed receiver, e.g., receiver 314B, and shared with the lower speed receiver, e.g., receiver 314A. In an embodiment, the DSP parameters are shared between the higher speed receiver, e.g., receiver 314B, and the lower speed receiver, e.g., receiver 314A, using protocol data units (PDUs) that are transmitted between the two transceivers, 310A and 310B. The lower speed receiver, e.g., receiver 314A, uses the values of the DSP parameters computed by the higher speed receiver, e.g., receiver 314B, which can help to reduce heat generation, power consumption, and/or processing delays.

Because bandwidth can be a limited resource and because latency of data communications can be critical in networks such as IVNs, it is desirable to communicate information related to DSP parameters in an efficient manner. In an embodiment, values of DSP parameters are embedded into the header field of PDUs to conserve bandwidth and operations, administration, and management (OAM) words are embedded into the payload field of PDUs to ensure timely communication of information related to the DSP parameters, e.g., information indicating the timing for using values of DSP parameters, information indicating the type of DSP parameters and/or control information related to DSP data exchange.

Figure 4:
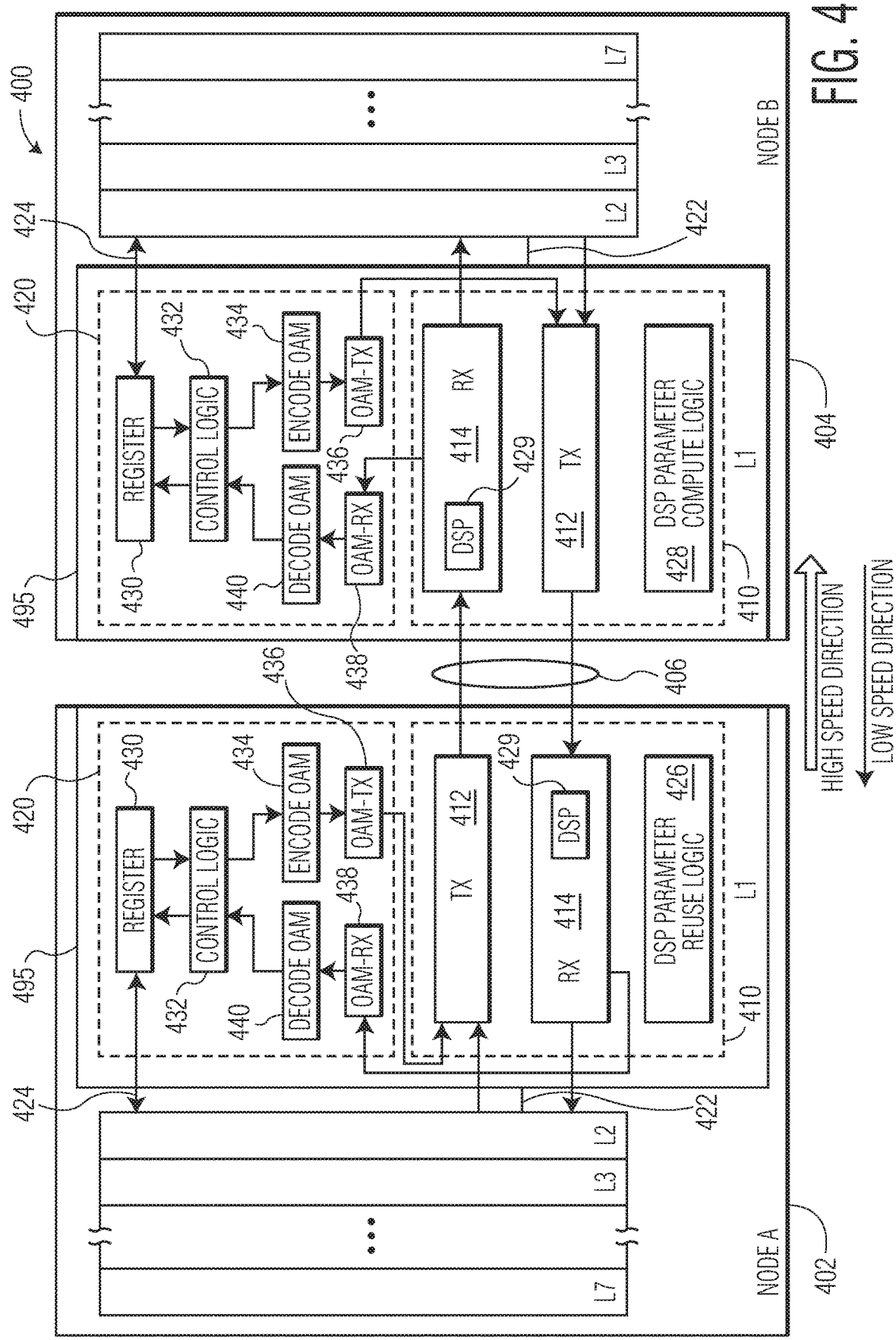
FIG. 4 depicts a point-to-point communications network that connects two nodes via a communications medium.

A technique for managing the sharing of DSP parameter information is described with reference to FIGS. 4, 5A, and 5B. FIG. 4 depicts a point-to-point communications network 400 that connects two nodes, node A 402 and node B 404, via a communications medium 406. In the example of FIG. 4, the nodes are configured with the relative speeds as described with reference to FIG. 3. In the example, FIG. 4 depicts components at the physical layer of node A 402 and node B 404. In the example of FIG. 4, the physical layers are embodied as integrated circuits 495 (e.g., stand-alone IC devices) that incorporate physical layer functionality, referred to herein as "PHY chips." The PHY chips 495 may be components of nodes A and B, respectively, and the nodes may include additional elements, such as elements of an electronic control unit (ECU) as is known in the field of in-vehicle networks. For example, ECUs may also include a microprocessor, a sensor, and/or an actuator as is known in the field. The nodes shown in FIG. 4 also include higher level layers of the respective nodes, e.g., the data link layer (layer 2 or L2), the network layer (layer 3 of L3), and the application layer (layer 7 or L7), which may interact with the physical layer.

With reference to node A, 402, the PHY chip 495 includes a transceiver 410, DSP management logic 420, a Media Independent Interface (MII) 422 (e.g., 10 Gbps XGMII), and a Management Data Input/Output (MDIO) 424. The transceiver of node A includes a transmitter 412, a receiver 414, and DSP parameter reuse logic 426. With reference to node B, 404, the PHY chip 495 includes a transceiver 410, DSP management logic 420, a MII 422 (e.g., XGMII), and an MDIO 424. The transceiver 410 of node B 404 includes a transmitter 412, a receiver 414, and DSP parameter compute logic 428. The receivers 414 of the transceivers 410 include DSPs 429.

In the embodiment of FIG. 4, the DSP management logic 420 of both node A 402 and node B 404 includes a register 430, control logic 432, an encode OAM module 434, an OAM-TX module 436, an OAM-RX module 438, and a decode OAM module 440. The register is a memory register that stores information that can be used to control aspects of the network operation, e.g., control information. The control information may be read or written by an end-user. For example, in the case of an Ethernet based link, an end-user may request a PHY to transmit data in a lower rate in one direction. In an embodiment, the information held in the register 430 of the DSP management logic 420 is read only, while in other embodiments, at least some of the information can be written to the register by the control logic and/or by end users.

In an embodiment, the encode OAM module 434 of each node is configured to encode information received from the control logic 432 into OAM bits. For example, the encode OAM module is configured to encode control commands from the control logic into an OAM word according to OAM encoding rules. For example, a control command to switch a receiver to a new DSP parameter setting may be encoded into an 8-bit OAM word.

In an embodiment, the OAM-TX module 436 of each node is configured to buffer the encoded OAM bits (e.g., as an OAM word) before the encoded OAM bits are embedded into the payload field of a PDU. For example, an OAM word is embedded into a stream of data that makes up the payload. In an embodiment, the OAM-TX module includes a buffer for temporarily storing the OAM bits before the OAM bits are embedded into the payload field of a PDU.

In an embodiment, the OAM-RX module 438 of each node is configured to buffer encoded OAM bits (e.g., as an encoded OAM word) that have been extracted from the payload field of a PDU. For example, an OAM word is extracted from a stream of data that makes up the payload. In an embodiment, the OAM-RX module includes a buffer for temporarily storing the extracted encoded OAM word.

In an embodiment, the decode OAM module 440 of each node is configured to decode the encoded OAM word that is extracted from the payload field of the PDU and to pass the decoded information to the control logic. For example, the decode OAM module is configured to decode the OAM word to control commands that are understood by the control logic. For example, an 8-bit OAM word is decoded into a control command, which is understood by the control logic, to switch a receiver to a new DSP parameter. In an embodiment, the encode OAM module 434 and the decode OAM module 440 encode and decode according to a complementary set of encoding and decoding rules.

In an embodiment, the control logic 432 of each node 402 and 404 controls the operation of the DSP management logic. For example, the control logic generates and interprets the control information that is communicated via the OAM bits. Additionally, the control logic may coordinate the sharing of the values of the DSP parameters between the nodes. For example, the control logic coordinates the embedding of the values of the DSP parameters into the PDUs.

In an embodiment, the DSP parameter compute logic 428 is configured to compute values for DSP parameters. For example, the DSP parameter compute logic may compute settings for parameters of the DSPs 429 of the receivers such as equalizer settings, echo cancellation settings, automatic gain control (AGC) settings, clock data recovery (CDR) settings, baseline wander (BLW) settings, and/or data recovery settings. In some cases, the value of a DSP parameter may be a numerical value that represents the magnitude of the parameter and in other cases the value of a DSP parameter may be a value that represents a state of the parameter, such as equalizer enabled/disabled. The values of DSP parameters may be digitally represented in other ways and may represent other aspects of DSP parameters.

In an embodiment, the DSP parameter reuse logic 426 is configured to use the values of DSP parameters to program a DSP 429. For example, the DSP parameter reuse logic may use a received value of a DSP parameter to program an equalizer block, an echo cancellation block, an automatic gain control (AGC) block, a clock data recovery (CDR) block, a baseline wander (BLW) block, and/or a data recovery block of a DSP of a receiver. In some cases, the DSP parameter reuse logic may program the DSP with a value of a DSP parameter that represents the magnitude of the parameter and in other cases the DSP parameter reuse logic may program the DSP with a value of a DSP parameter that represents a state of the parameter, such as equalizer enabled/disabled. In an embodiment, using the value of the DSP parameter to program a DSP can involve using the value of the DSP parameter as received from the other node and in another embodiment, using the value of the DSP parameter to program a DSP can involve using a derivative of the value of the DSP parameter (e.g., a down-converted version of the value of the DSP parameter) as received to program the DSP.

As described above, values of DSP parameters are computed at node B 404 and shared with node A 402. An example of a DSP parameter sharing operation is described with reference to FIGS. 4, 5A, and 5B. In particular, an example of a transmission operation to share information is described with reference to FIGS. 4 and 5A and an example of a receive operation to share information is described with reference to FIGS. 4 and 5B.

Figure 5A:
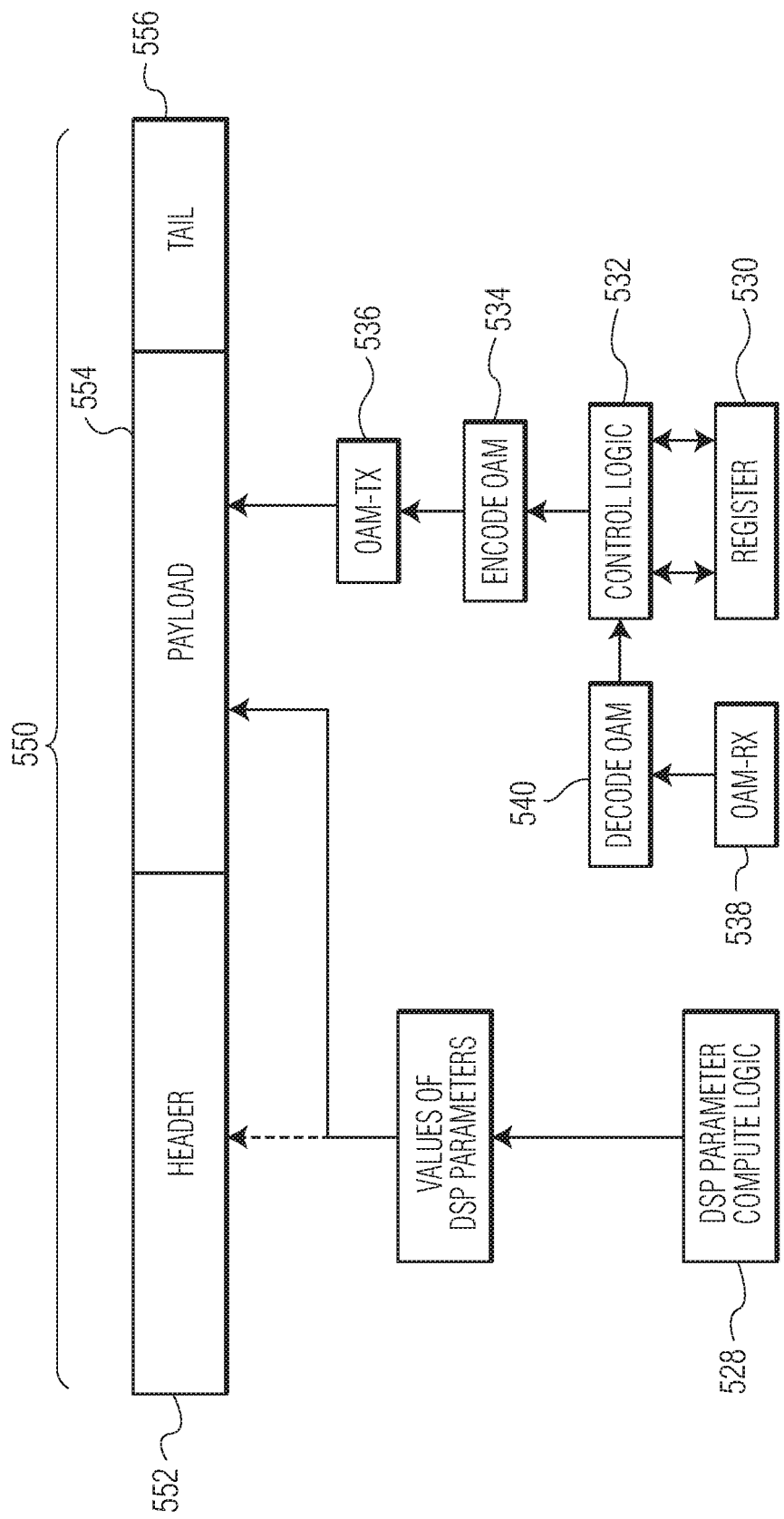
FIG. 5A illustrates an example of a transmission operation to share information between two nodes.

With reference to FIG. 5A, a PDU 550 includes a header field 552, a payload field 554, and a tail field 556. In the example of FIG. 5, the PDU is transmitted on the backward channel, e.g., from node B to node A. As illustrated in FIG. 5A, values of DSP parameters are embedded into the payload field of the PDU and control information is embedded into the payload field of the PDU. The values of DSP parameters are generated at the DSP parameter compute logic 528 and may include values of, for example, an equalizer setting, an echo canceller setting, a clock data recovery (CDR) setting, an automatic gain control (AGC) setting, a digital baseline wander (BLW) setting, and/or filter coefficients. In an embodiment, the values of DSP parameters are embedded into the payload field of the PDU as a key:value combination (e.g., DSP parameter code: value of DSP parameter). In an alternative embodiment, it may be possible to embed information related to DSP parameters (e.g., the values of the DSP parameters) into the header field of the PDU as indicated by dashed line arrow. For example, the values of DSP parameters may be embedded into the header field of the PDU in order to conserve space in the payload field for other data that is to be communicated between the nodes, thereby conserving bandwidth for other data to be communicated from node B to node A.

FIG. 5A also illustrates a process for embedding control information into the payload field of PDUs, e.g., control information that indicates the timing for using values of DSP parameter. As illustrated in FIG. 5A, the control logic 532 may receive data from the register 530, such as a command to reduce the data rate of the receiver and/or to disable a certain DSP block or blocks. The control logic may also receive data from the decode OAM module 540 and OAM-RX module 538 such as information related to the capabilities of the other receiver. The control logic then determines the control information that is to be sent to the other node, e.g., to node A, encodes the information into an OAM word (or OAM words) at the encode OAM module 534, and then buffers the OAM word at the OAM-TX module 536 before the OAM bits are embedded into the payload field 554 of the PDU. The PDU is then transmitted across the communications medium to the other node, e.g., to node A.

Figure 5B:
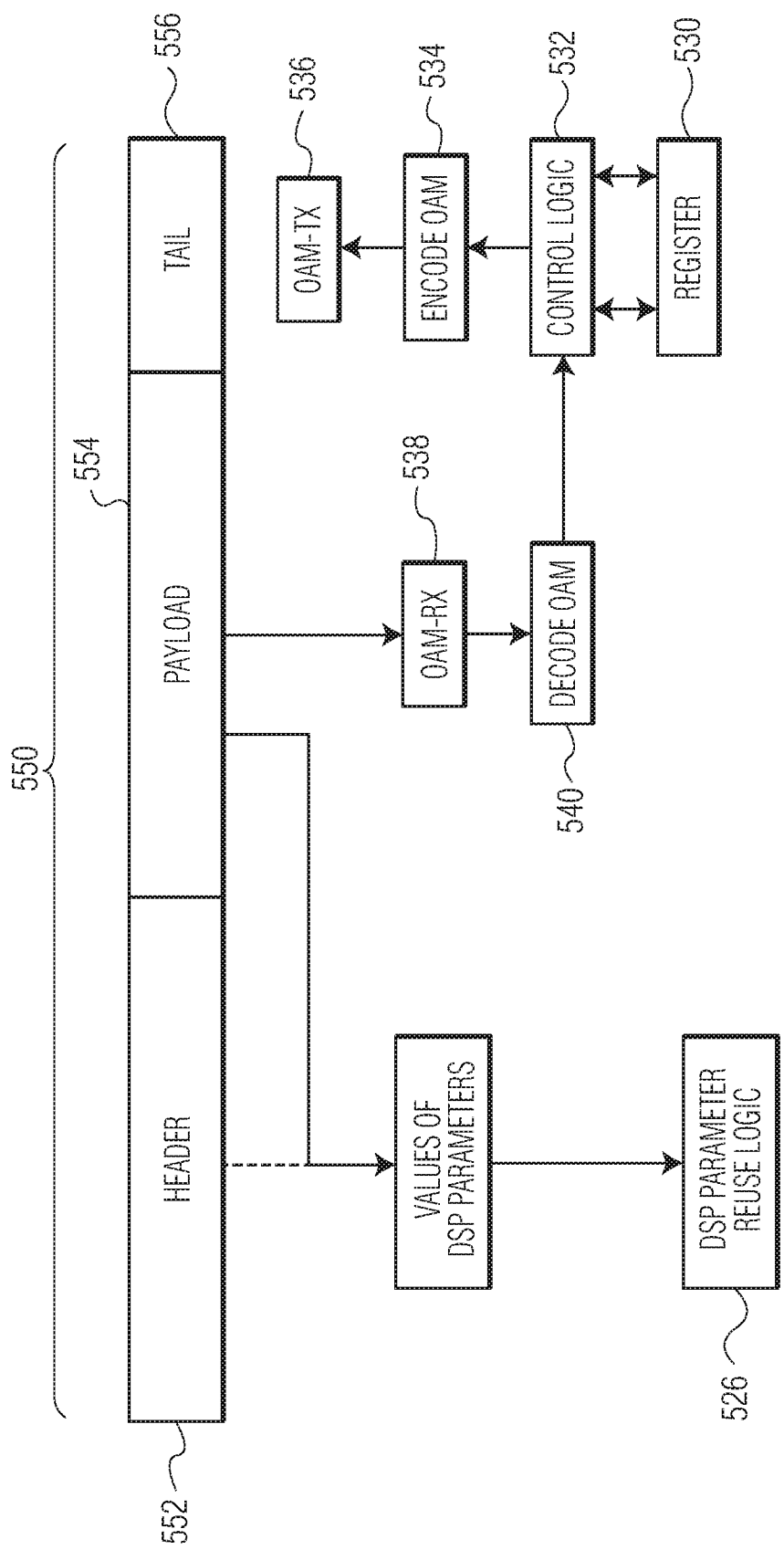
FIG. 5B illustrates an example of a receive operation to share information between two nodes.

With reference to FIG. 5B, the PDU 550 transmitted from node B across the communications medium is received at node A, e.g., the lower rate node. As illustrated in FIG. 5B, values of DSP parameters are extracted from the payload field 554 of the PDU and control information is extracted from the payload field of the PDU. In an alternative embodiment, values of DSP parameters may be extracted from the header field 552 of the PDU as indicated by the dashed line arrow. The extracted values of the DSP parameters are provided to the DSP parameter reuse logic. After the values of the DSP parameters are extracted from the payload field of the PDU and provided to the DSP parameter reuse logic 526, the values of the DSP parameters may need to be down-sampled to relevant blocks at their corresponding speed. For example, some DSP settings may be correlated to each other as a function of the ratios of different data rates of the receivers, e.g., (10 Gbps/0.5 Gbps)=(X forward channel setting/Y backward channel setting). Down-sampling may involve finding a setting based on a known setting and a known ratio of data rates in the forward and backward channels. The values of the extracted DSP parameters can then be used by the DSP parameter reuse logic to program the DSP of the receiver. Because the DSP of node A is reusing DSP parameters computed by the receiver of node B, computational resources are conserved at node A, which can translate to a reduction in power consumption, a reduction in heat generation, and a reduction in processing delays.

FIG. 5B also illustrates a process for extracting the control information, which is carried in OAM bits, from the payload field 554 of the PDU 550. The OAM bits are extracted from the payload field and provided to the OAM-RX module 538 for buffering and then decoded by the decode OAM module 540 into control information that can be understood by the control logic 532. The decoded control information is then provided to the control logic, which can use the information to set a register 530 and or to generate additional control information that is to be transmitted to other nodes, e.g., to node B via the encode OAM module 534 and the OAM-TX module 536.

In sum, by communicating values of DSP parameters from, for example, a higher rate receiver (e.g., from node B, 314B) to a lower rate receiver (e.g., node A, 314A), resources can be conserved at the lower rate receiver, which can translate to a reduction in power consumption, a reduction in heat generation, and/or a reduction in processing delays. Also, by embedding the values of the DSP parameters into the header field of the PDUs, bandwidth between the two nodes is conserved for other data that needs to be communicated from node B to node A.

FIG. 6A is a process flow diagram of a method for performing physical layer operations in a communications network. According to the method, at block 670, a value of a DSP parameter is determined for a receiver at a first network node. At block 672, at the first network node, the value of the DSP parameter is embedded into a protocol data unit (PDU). At block 674, the PDU is transmitted from the first network node.

FIG. 6B is a process flow diagram of a method for performing physical layer operations in a communications network. According to the method, at a first network node (indicated by dashed block 676), a value of a DSP parameter is determined for a receiver of the first network node (block 678), the value of the DSP parameter is embedded into a PDU (block 680), and the PDU is transmitted from the first network node (block 682). Further, according to the method, at a second network node (indicated by dashed block 684), the PDU is received, the second network node having a receiver that includes a DSP (block 686), the value of the DSP parameter is extracted from the PDU (block 688), the DSP of the receiver of the second network node is configured using the value of the DSP parameter (block 690), and the DSP of the receiver of the second network node is operated as configured using the value of the DSP parameter.

Figure 7A:
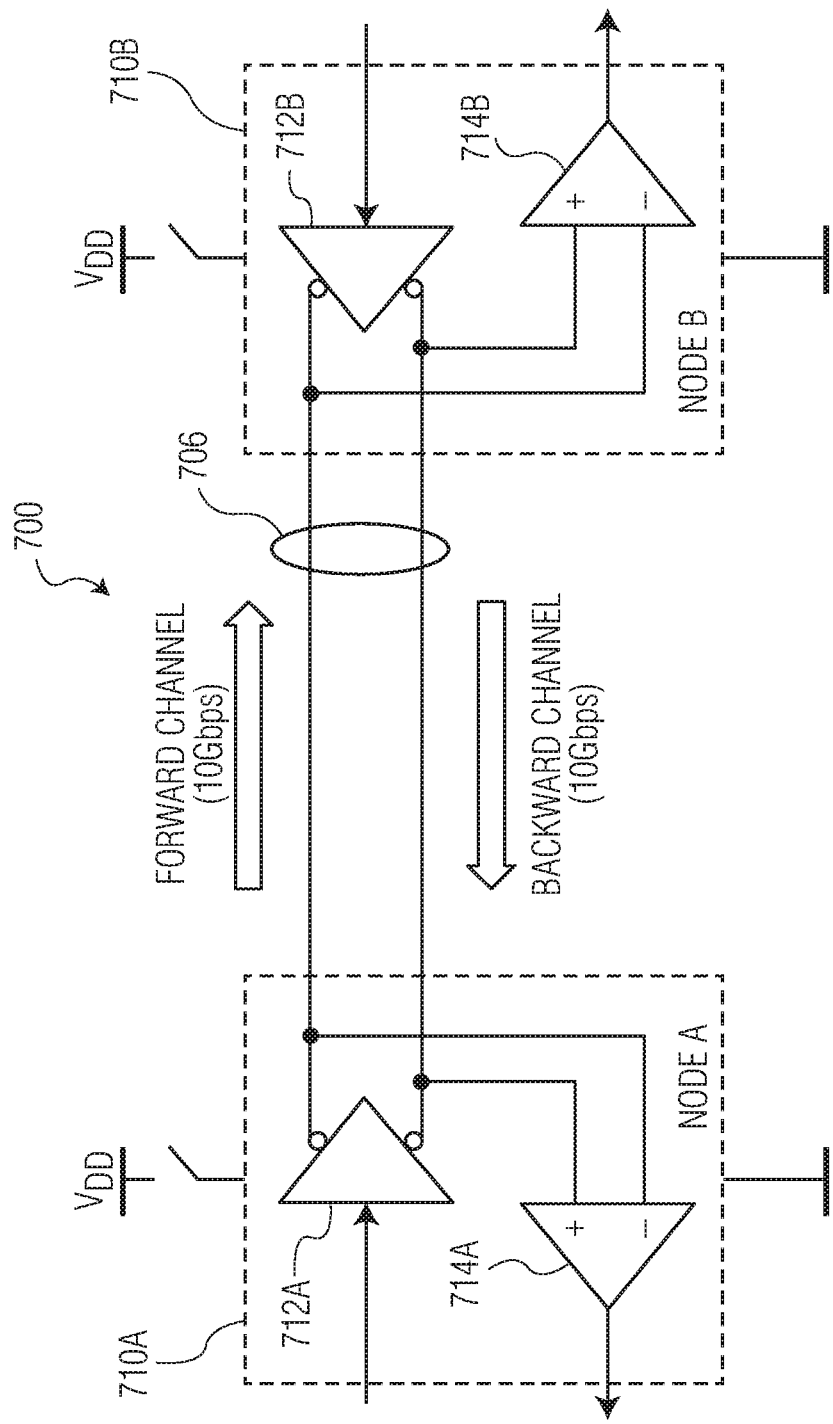
FIG. 7A depicts an embodiment of a point-to-point communications network that illustrates two receivers that are capable of transmitting and receiving data at the same maximum data rate.

As described above with reference to FIG. 2, communications between two nodes can be symmetrical or asymmetrical. In some use cases, two nodes may be equipped with transceivers that have the capability to communicate at the same rate, e.g., at the same maximum data rate. For example, both transceivers in an Ethernet-based point-to-point communications network may be designed to transmit and receive data at a maximum data rate of 10 Gbps. FIG. 7A depicts an embodiment of a point-to-point communications network 700 that illustrates two transceivers 710A and 710B that are capable of transmitting and receiving data at the same maximum data rate, e.g., 10 Gbps. However, even though both transceivers are capable of communicating at a maximum data rate of 10 Gbps duplex, there may be other use cases where the data flow is asymmetrical such that, for example, a forward channel requires 10 Gbps while the backward channel only requires 0.5 Gbps. In such a use case, the receiver that receives the backward channel may be unnecessarily consuming resources and generating heat if the receiver operates as if it will be receiving data at 10 Gbps.

In accordance with an embodiment of the invention, a technique for performing operations in a communications network is disclosed. The technique involves determining, at a first network node in the communications network, that a DSP of a receiver of a network node in the communications network can operate at a reduced functionality level, and communicating the determination from the first network node to a second network node in the communications network in a PDU, wherein the DSP of a receiver of a network node that can operate at a reduced functionality level is a DSP of a receiver of one of the first network node and the second network node. In an example use case, the receiver of the first network node and the receiver of the second network node are capable of receiving data at the same maximum data rate but the functionality level of a DSP at one of the first network node and the second network node is reduced after communicating the determination from the first network node to the second network node in the communications network. The functionality level of the DSP can be reduced by, for example, disabling an adaptive algorithm portion of a digital processing block of the DSP and/or by disabling altogether a digital processing block of the DSP. There are other ways in which the functionality level of a DSP can be reduced. By reducing the functionality level of the DSP of a receiver of, for example, a lower bandwidth backward channel, resources can be conserved. For example, computing resources at the receiver can be conserved. Additionally, because the level of functionality of a DSP of a receiver can be adjusted to adapt to the bandwidth requirements of the particular use case, PHY chips can be more flexible and thus can be used in a wide range of applications. For example, the same type of PHY chip can be installed at every node of a communications network and then the functionality level of the PHY chips can be individually adjusted to correspond to the bandwidth requirements of the specific use case of the nodes. Such an approach can enable mass production of the same type of PHY chip, which can drive down the overcall per-unit cost of the PHY chips.

In an embodiment, the technique also involves determining a value of a DSP parameter for a receiver, embedding the value of the DSP parameter into a PDU, and transmitting the PDU on the communications network. The technique may also involve receiving the PDU at another node, extracting the value of the DSP parameter from the PDU, configuring a DSP of a receiver using the value of the DSP parameter, and operating the DSP of the receiver as configured using the value of the DSP parameter. The shared values of DSP parameters may include an equalizer setting, an echo canceller setting, a clock data recovery (CDR) setting, an automatic gain control (AGC) setting, and/or a digital baseline wander (BLW) setting. By communicating values of DSP parameters from a higher rate receiver to a lower rate receiver, resources can be conserved at the lower rate receiver, which can translate to a reduction in power consumption, a reduction in heat generation, and/or a reduction in processing delays.

In an embodiment of the technique, a value of a DSP parameter is embedded into a header field of the PDU. In an embodiment of the technique, an OAM word is embedded into a payload field of the PDU to communicate information related to the value of the DSP parameter. By embedding the values of the DSP parameters into the header field of the PDUs, bandwidth between the two nodes is conserved for other data that needs to be communicated from node B to node A.

Figure 7B:
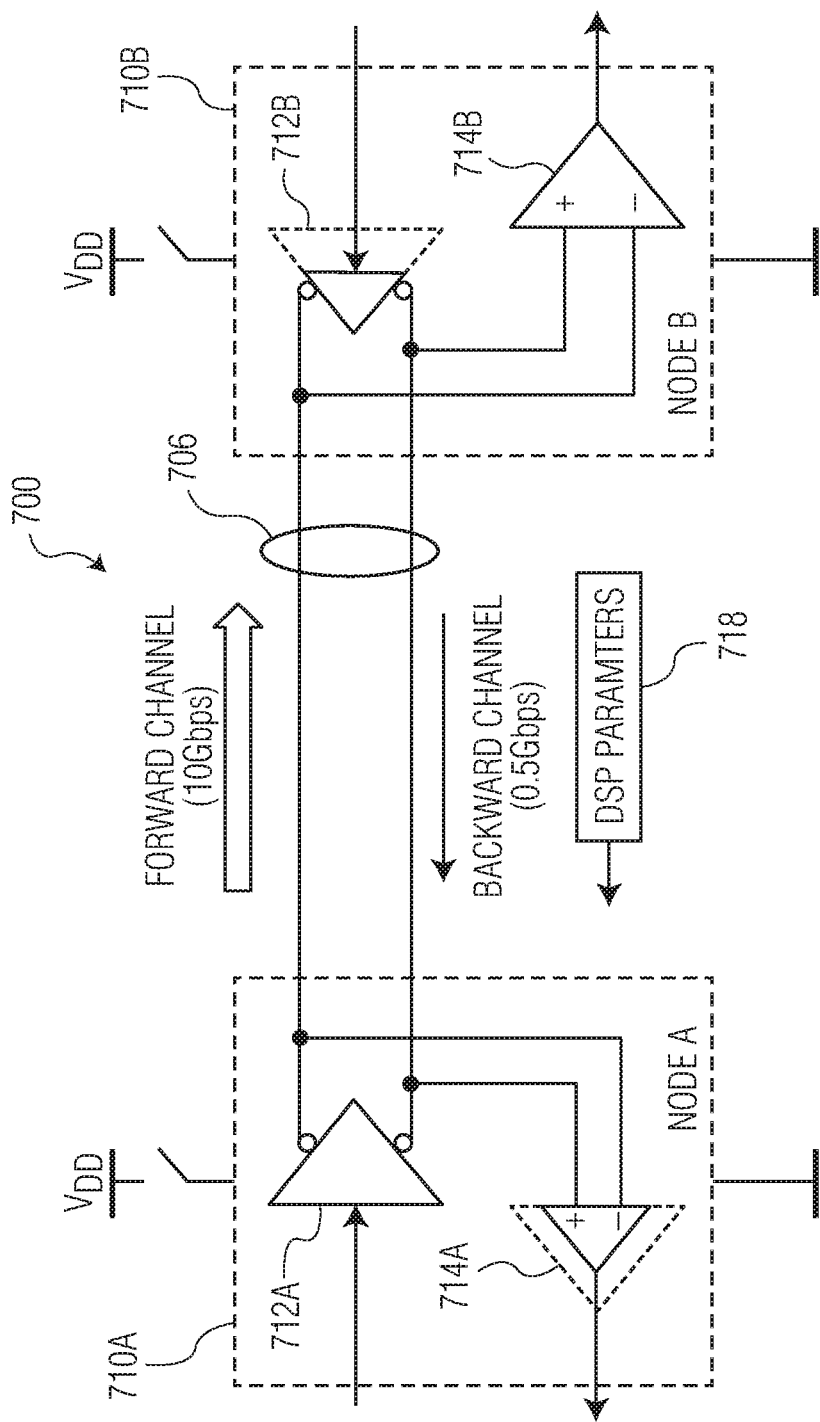
FIG. 7B depicts an embodiment of the point-to-point communications network of FIG. 7A that illustrates a reduced functionality level of the receiver of the backward channel.

FIG. 7B depicts an embodiment of the point-to-point communications network 700 of FIG. 7A that illustrates a reduced functionality level of the receiver of the backward channel, e.g., the receiver 714A in node A, 710A. In the example of FIG. 7B, the size of the receiver 714A is reduced from its original size (original size indicated by the dashed lines) to illustrate that the functionality level of the receiver has been reduced, for example, by disabling certain blocks of the DSP. As illustrated in FIG. 7B, the forward channel is maintained at 10 Gbps (e.g., the functionality level of the receiver 714B is set to receive at 10 Gbps) and the backward channel is reduced to 0.5 Gbps (e.g., the functionality level of the receiver 714A is reduced to receive at 0.5 Gbps). In an embodiment, the functionality level of a receiver is reduced by reducing the functionality level of the DSP of the receiver. For example, the functionality of the DSP of the receiver is reduced by disabling (e.g., shutting down) at least one of the DSP processing blocks, e.g., the equalizer block, the echo cancellation block, the automatic gain control (AGC) block, the clock data recovery (CDR) block, the baseline wander (BLW) block, and/or data recovery block. In an embodiment, it is possible to increase the functionality level of the receiver back up to its original, or maximum, level by enabling (e.g., turning on) the DSP blocks that were previously shut down.

In an embodiment, the nodes of a point-to-point communications network are configured to be able to adapt to the bandwidth requirements of the particular application that is being implemented. For example, a PHY chip is configured to be able to adapt to the bandwidth requirements of the particular application that the PHY chip is supporting. In an example, the nodes of a point-to-point communications network are able to determine when to reduce the functionality of a DSP of a receiver and are able to communicate the determination between the two nodes so that the DSP of at least one of the two nodes can be operated at a reduced functionality level. A technique for managing the functionality level of a receiver in a point-to-point communications network is described with reference to FIGS. 7A, 7B, 8, 9A, and 9B. For example, FIG. 7A depicts a first state of the point-to-point communications network 700 in which the two transceivers 710A and 710B are configured to communicate at the same data rate and FIG. 7B depicts a second state of the same point-to-point communications network in which the functionality level of the DSP (not shown) of receiver 714A of the transceiver 710A has been reduced based on a determination that the functionality level of the DSP can be operated at a reduced functionality level based on, for example, the particular use case in the point-to-point communications network (e.g., the case of a backup camera, Radar, and/or LIDAR in an IVN).

Figure 8:
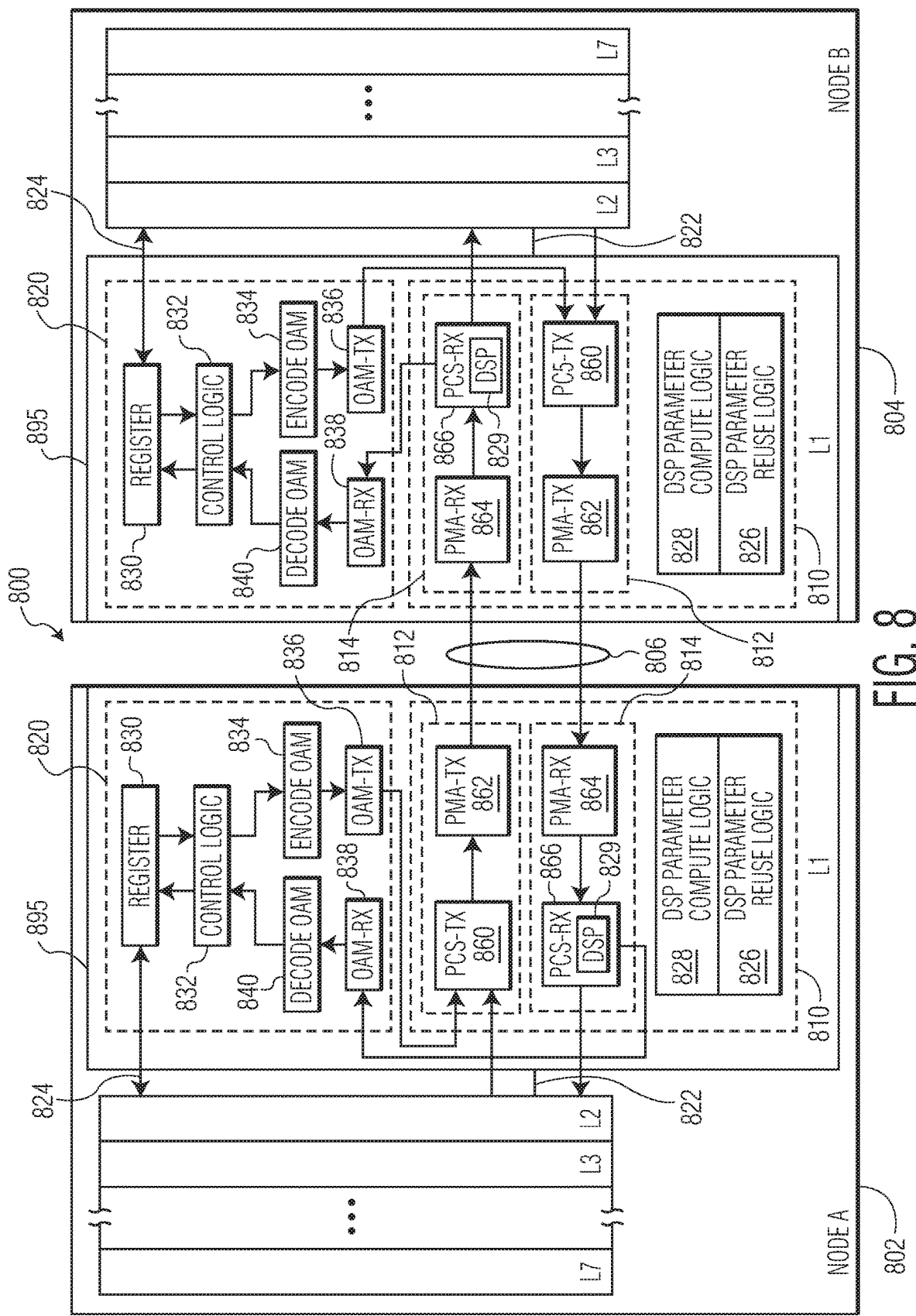
FIG. 8 depicts an Ethernet-based point-to-point communications network that includes two nodes.

FIG. 8 depicts an Ethernet-based point-to-point communications network 800 that includes two nodes, node A, 802 and node B, 804, that are similar to the two nodes described with reference to FIG. 4. In particular, FIG. 8 depicts an example of components at the physical layer of the two nodes, node A 802 and node B 804. In the example of FIG. 8, the physical layers are embodied as integrated circuits 895 that incorporate physical layer functionality, referred to herein as "PHY chips" or stand-alone IC devices. The PHY chips 895 may be components of the nodes A and B, respectively, and the nodes may include additional elements, such as elements of an electronic control unit (ECU) as is known in the field of in-vehicle networks. For example, ECUs may also include a microprocessor, a sensor, an actuator, etc. as is known in the field. FIG. 8 also depicts higher level layers of the respective nodes, e.g., the data link layer (layer 2, L2), the network layer (layer 3, L3), and the application layer (layer 7, L7), which may interact with the physical layer.

With reference to node A, 802, the PHY chip 895 includes a transceiver 810, DSP management logic 820, a MII 822 (e.g., XGMII), and an MDIO 824. The transceiver 810 of node A 802 includes a transmitter 812, a receiver 814, DSP parameter compute logic 828, and DSP parameter reuse logic 826. With reference to node B, 804, the PHY chip 895 includes a transceiver 810, DSP management logic 820, a MII 822 (e.g., XGMII), and an MDIO 824. The transceiver 810 of node B 804 includes a transmitter 812, a receiver 814, DSP parameter compute logic 828, and DSP parameter reuse logic 826. In an embodiment, the transceivers of the nodes A and B are configured as Ethernet transceivers. The transceivers 810 include a physical coding sublayer transmitter (PCS-TX) 860, a physical medium attachment transmitter (PMA-TX) 862, a physical medium attachment receiver (PMA-RX) 864, and a physical coding sublayer receiver (PCS-RX) 866. The receivers include a DSP 829, which DSPs are illustrated as being within the physical coding sublayer receivers (PCS-RX) although the DSP may also perform functions of the physical medium attachment receiver (PMA-RX). The physical medium attachment transmitter (PCS-TX), the physical medium attachment transmitter (PMA-TX), the physical coding sublayer receiver (PCS-RX), and the physical medium attachment receiver (PMA-RX) perform functions that include functions which are known, for example, in the field of Ethernet based in-vehicle networks.

In the embodiment of FIG. 8, the DSP management logic 820 of both node A 802 and node B 804 includes a register 830, control logic 832, an encode OAM module 834, an OAM-TX module 836, an OAM-RX module 838, and a decode OAM module 840. The register is a memory register that stores information that can be used to control aspects of the network operation, e.g., control information. The control information may be read or written by an end-user. For example, in the case of an Ethernet based link, an end-user may request a PHY chip to transmit data in a lower rate in one direction. In another example, information in the register may indicate that a link go to a low power mode, requesting a PHY chip to go to asymmetrical full duplex communication mode, and/or specifying a particular data rate. In an embodiment, the information held in the register 830 of the DSP management logic 820 is read only, while in other embodiments, at least some of the information can be written to the register by the control logic and/or by end users.

In an embodiment, the encode OAM module 834 of each node is configured to encode information received from the control logic into OAM bits. For example, the encode OAM module is configured to encode control commands from the control logic into an OAM word according to OAM encoding rules. For example, a control command to switch a receiver to a new DSP parameter setting may be encoded into an 8-bit OAM word.

In an embodiment, the OAM-TX module 836 of each node is configured to buffer the encoded OAM bits (e.g., as an OAM word) before the encoded OAM bits are embedded into the payload field of a PDU. For example, an OAM word is embedded into a stream of data that makes up the payload. In an embodiment, the OAM-TX module includes a buffer for temporarily storing the OAM bits before the OAM bits are embedded into the payload field of a PDU.

In an embodiment, the OAM-RX module 838 of each node is configured to buffer encoded OAM bits (e.g., as an encoded OAM word) that have been extracted from the payload field of a PDU. For example, an OAM word is extracted from a stream of data that makes up the payload. In an embodiment, the OAM-RX module includes a buffer for temporarily storing the extracted encoded OAM word.

In an embodiment, the decode OAM module 840 of each node is configured to decode the encoded OAM word that is extracted from the payload field of the PDU and to pass the decoded information to the control logic. For example, the decode OAM module is configured to decode the OAM word to control commands that are understood by the control logic. For example, an 8-bit OAM word is decoded into a control command, which is understood by the control logic, to switch a receiver to a new DSP parameter. In an embodiment, the encode OAM module and the decode OAM module encode and decode according to a complementary set of encoding and decoding rules.

In an embodiment, the control logic 832 of each node controls the operation of the DSP management logic 820. For example, the control logic enables a node to adapt to the bandwidth requirements of the particular application that is being implemented. For example, the control logic is configured to be able to adapt the PHY chip 895 to the bandwidth requirements of the particular application that the PHY chip is supporting. In an example, the control logic of two nodes are able to determine when to reduce the level of functionality of the DSP of the receiver of at least one of the nodes and are able to communicate the determination between the two nodes so that the DSP of at least one of the two nodes can be operated at a reduced functionality level. Additionally, the control logic interprets the control information that is communicated via the OAM bits and may coordinate the sharing of the values of the DSP parameters between the nodes. For example, the control logic may coordinate the embedding of the values of the DSP parameters into the PDUs.

In an embodiment, the DSP parameter compute logic 828 of each node is configured to compute values for DSP parameters. For example, the DSP computer logic may compute settings for parameters of the DSPs 829 of the receivers 814, such as equalizer settings, echo cancellation settings, automatic gain control (AGC) settings, clock data recovery (CDR) settings, baseline wander (BLW) settings, and data recovery settings. In some cases, the value of a DSP parameter may be a numerical value that represents the magnitude of the parameter and in other cases the value of a DSP parameter may be a value that represents a state of the parameter, such as equalizer enabled/disabled. The values of DSP parameters may be digitally represented in other ways.

In an embodiment, the DSP parameter reuse logic 826 of each node is configured to utilize the values of DSP parameters to program a DSP 829. For example, the DSP parameter reuse logic may use a received value of a DSP parameter to program an equalizer block, an echo cancellation block, an automatic gain control (AGC) block, a clock data recovery (CDR) block, a baseline wander (BLW) block, and/or a data recovery block of a DSP of a receiver. In some cases, the DSP parameter reuse logic may program the DSP with a value of a DSP parameter that represents the magnitude of the parameter and in other cases the DSP parameter reuse logic may program the DSP with a value of a DSP parameter that represents a state of the parameter, such as equalizer enabled/disabled.

As described above, a determination is made that a DSP of a receiver can operate at a reduced functionality level. The determination can be made based on how the nodes are being used. For example, if the forward or backward channel in the point-to-point communications network has a very different bandwidth requirement from the other channel, then the level of functionality of one of the DSPs of the nodes can be reduced. In an embodiment, the determination that a DSP of a receiver can operate at a reduced functionality level is made in response to parameters such as the magnitude of the AGC gain, the equalizer gain (e.g., Feed-Forward Equalizer (FFE) coefficients and Decision Feedback Equalizer (DFE) coefficients), and/or echo canceller gain (e.g., echo canceller coefficients). In an embodiment, the combination of AGC and equalizer gain can be used to identify a channel that is no longer acceptable. In an embodiment, echo canceller taps coefficient can indicate how bad a cable is functioning in terms of return loss. In an embodiment, if the equalizer gain is beyond a certain threshold and depending on the need of the application (which may be set in the register 830, functionality can be reduced by disabling a block in the DSP.

In an embodiment, the decision to reduce the functionality of a DSP can be made at layer 1 (i.e., at the physical layer). For example, the decision to reduce the functionality of a DSP is made within the PHY chip 895. In an embodiment, the decision to reduce the functionality of a DSP could be made at layer 1 by the control logic 832 in response to a value from the register 830 that indicates the application that is being supported by the PHY chip. In another embodiment, the decision to reduce the functionality of a DSP of a receiver could be made at a higher layer.

In an embodiment, the decision to reduce the level of functionality of a DSP is made by and/or coordinated by the control logic 832 of the DSP management logic 820. In one embodiment, the decision to reduce the level of functionality of a DSP can be made at the node at which the receiver will operate at the reduced functionality level. In another embodiment, the decision to reduce the level of functionality of a DSP can be made at the node at which the receiver will operate at an unchanged functionality level, e.g., at its maximum transmission rate or its intended optimal transmission rate. In still another embodiment, the decision can be made in collaboration between the two nodes, e.g., a negotiation. Or, the decision can be made by some other node in the communications network.

As described above with reference to FIGS. 7B and 8, values of DSP parameters are computed at node B and shared with node A. An example of a DSP parameter sharing operation is described with reference to FIGS. 8, 9A, and 9B. In particular, an example of a transmission operation to share information is described with reference to FIGS. 8 and 9A and an example of a receive operation to share information is described with reference to FIGS. 8 and 9B.

Figure 9A:
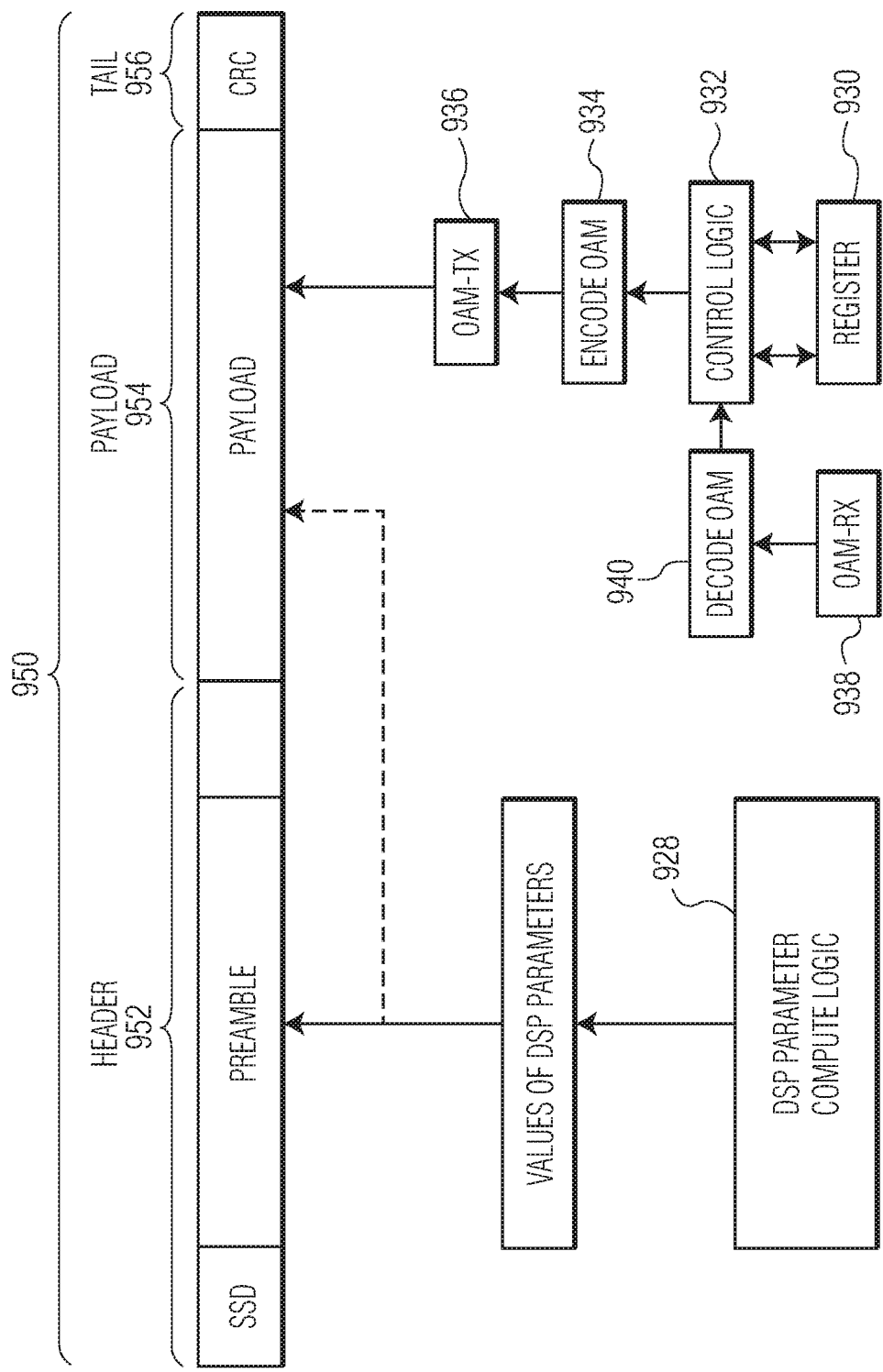
FIG. 9A illustrates an example of a transmission operation to share information between two nodes.

With reference to FIG. 9A, a PDU 950 includes a header field 952, a payload field 954, and a tail field 956. In the example of FIG. 9A, the PDU is an Ethernet-based PDU and the header field includes a start of stream delimiter (SSD) field, a preamble field, and a media access control (MAC) header field and the tail field includes a cyclical redundancy check (CRC) field. In the example of FIG. 9A, the PDU is transmitted on the backward channel, e.g., from node B to node A. As illustrated in FIG. 9A, values of DSP parameters are embedded into the preamble field of the PDU and control information is embedded into the payload field of the PDU. The values of DSP parameters are generated by the DSP parameter compute logic 928 and may include values of, for example, an equalizer setting, an echo canceller setting, a clock data recovery (CDR) setting, an automatic gain control (AGC) setting, a digital baseline wander (BLW) setting, and/or filter coefficients. In an embodiment, the values of the DSP parameters are provided as key:value (e.g., DSP parameter:value of the DSP parameter). In an embodiment, the values of DSP parameters are embedded into the preamble field of the PDU in order to conserve space in the payload field for other data that is to be communicated between the nodes. Although the value of the DSP parameter is embedded into the preamble field in the example of FIG. 9A, the value of the DSP parameter could be embedded into a different field of the PDU, such as the payload field 954 of the PDU 950 as indicated by the dashed line arrow. In an embodiment, values of DSP parameters may be embedded into the payload field of the PDU instead of into the header field or in addition to into the header field.

FIG. 9A also illustrates a process for embedding control information into the payload field 954 of the PDU 950. As illustrated in FIG. 9A, the control logic 932 may receive data from the register 930, such as data that indicates a desired data rate of a particular channel of the link. The control logic may also receive data from the decode OAM module 940 and OAM-RX module 938 such as information realted to the capabilities of the other receiver. The control logic then determines the control information that is to be sent to the other node, e.g., to node A, encodes the information into an OAM word (or OAM words) at the encode OAM module 934, and then buffers the OAM word at the OAM-TX module 936 before the OAM bits are embedded into the payload field of the PDU. The PDU is then transmitted across the communications medium to the other node, e.g., to node A.

Figure 9B:
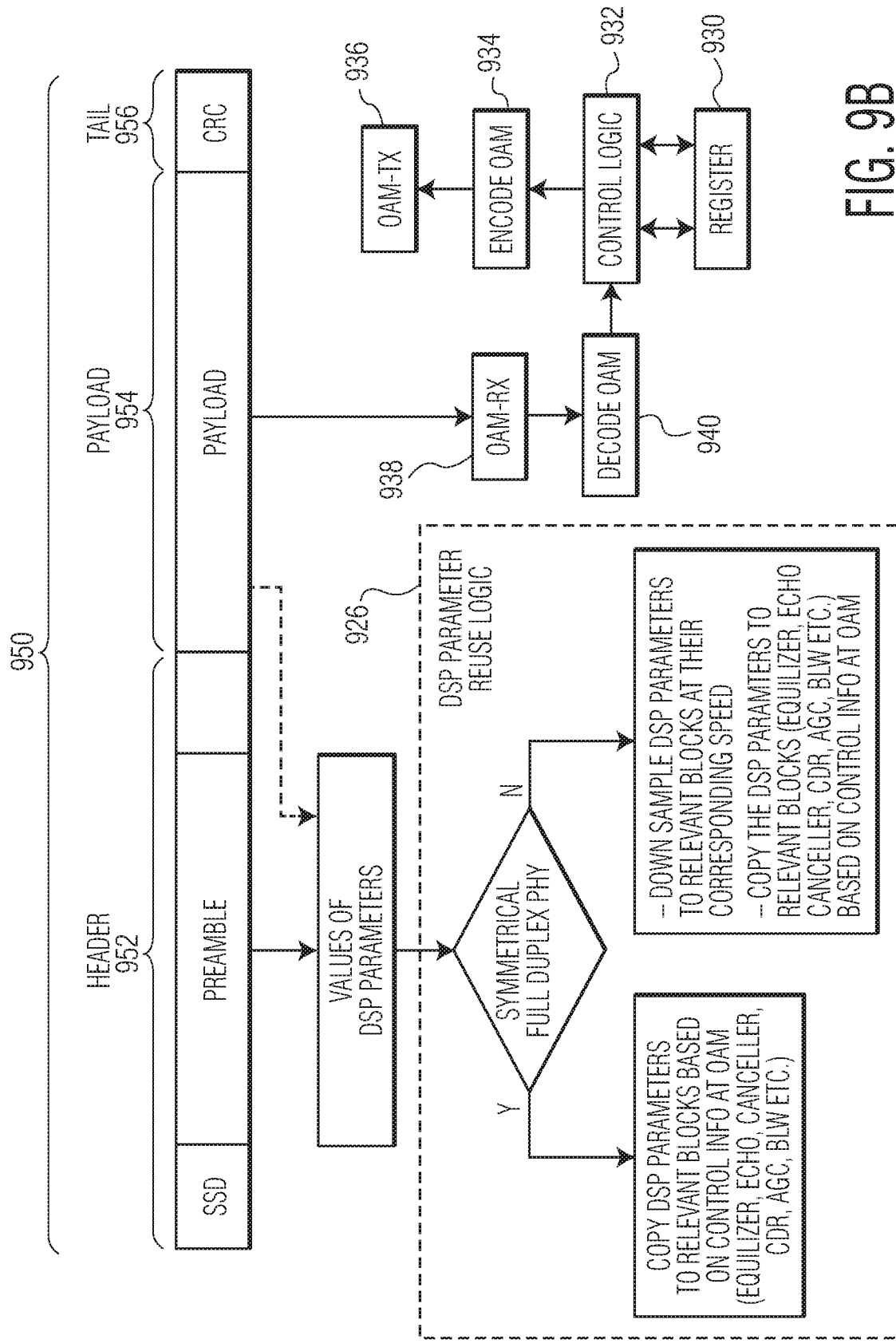
FIG. 9B illustrates an example of a receive operation to share information between two nodes.

With reference to FIG. 9B, the PDU 950 transmitted from node B across the communications medium is received at node A, e.g., the lower rate node. As illustrated in FIG. 9B, values of DSP parameters are extracted from the preamble field of the header field 952 of the PDU 950 and control information is extracted from the payload field 954 of the PDU. The extracted values of the DSP parameters are provided to the DSP parameter reuse logic 926. After the values of the DSP parameters are extracted from the preamble field of the PDU and provided to the DSP parameter reuse logic, the DSP parameters may need to be down-sampled to relevant blocks at their corresponding speed if the forward and backward channels are not symmetrical. For example, some DSP settings may be correlated to each other as a function of the ratios of different data rates of the receivers, e.g., (10 Gbps/0.5 Gbps)=(X forward channel setting/Y backward channel setting). Down-sampling may involve finding a setting based on a known setting and a known ratio of data rates in the forward and backward channels. The values of the extracted DSP parameters may then be used to program the DSP of the receiver. Because the DSP is reusing DSP parameters computed by the other receiver, computational resources are conserved, which can translate to a reduction in power consumption, a reduction in heat generation, and a reduction in processing delays.

FIG. 9B also illustrates a process for extracting the control information, which is carried in the OAM bits, from the payload field 954 of the PDU 950. The OAM bits are extracted from the payload field and provided to the OAM-RX module 938 for buffering and then decoded by the decode OAM module 940. The decoded control information is then provided to the control logic 932, which can use the information to set a register 930 and or to generate additional control information that is to be transmitted to other nodes, e.g., to node B, via the encode OAM module 934 and the OAM-TX module 836.

In sum, by communicating values of DSP parameters from a higher rate receiver (e.g., from node B, 804) to a lower rate receiver (e.g., node A, 802), resources can be conserved at the lower rate receiver, which can translate to a reduction in power consumption a reduction in heat generation and or a reduction in processing delays. Also, by embedding the values of the DSP parameters into the header field of the PDUs, bandwidth between the two notes is conserved for other data that needs to be communicated.

In an embodiment, the functionality level of the transmitter of the backward channel can also be reduced to correspond to the reduced data rate of the backward channel. As such, FIG. 7B also illustrates a reduced functionality level of the transmitter of the backward channel, e.g., the transmitter 712B in the transceiver 710 B of node B. In the example of FIG. 7B, the size of the transmitter 712B is reduced from its original size (original size indicated by the dashed lines) to illustrate that the functionality level of the transmitter has been reduced, for example, by disabling certain blocks of the transmitter. Reducing the complexity of the transmitter 712B can further reduce power consumption in the system.

As described above with reference to FIGS. 8, 9A, and 9B, the PHY chip 895 of each node includes DSP management logic 820, DSP parameter compute logic 828, and DSP parameter reuse logic 826. Thus, each PHY chip is able to implement a process that may involve the PHY chip implementing some or all of the above described operations, including for example, reducing its level of functionality, computing values for DSP parameters and sharing the computed values, and using values of DSP parameters that were received from another node. A PHY chip as described herein can provide flexibility to adapt the PHY chip to different use cases. Thus, different PHY chip designs are needed for each different use case.

Figure 10:
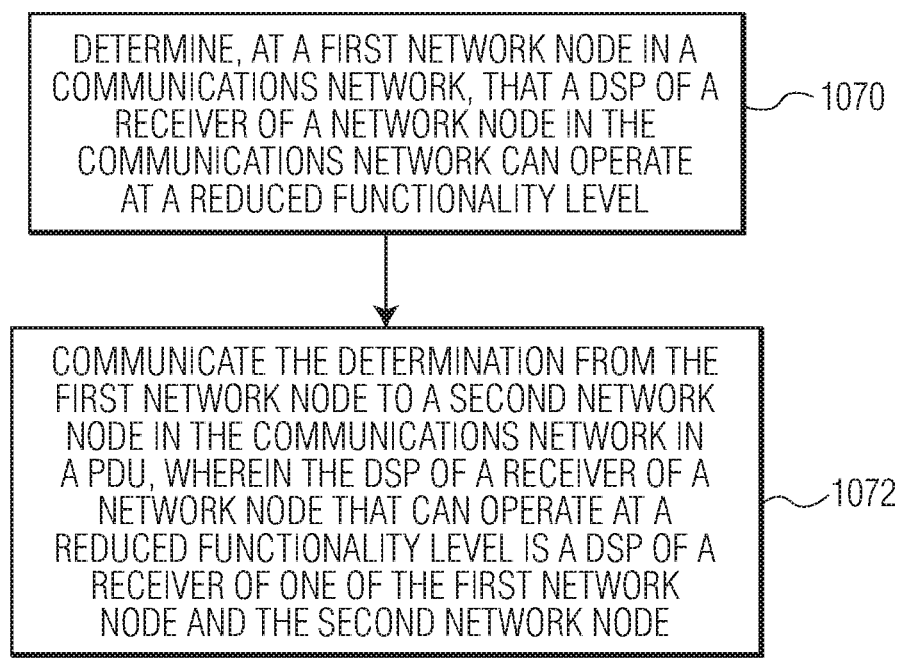
FIG. 10 is a process flow diagram of a method for performing operations in a communications network.

FIG. 10 is a process flow diagram of a method for performing operations in a communications network. According to the method, at block 1070, at a first network node in a communications network, it is determined that a DSP of a receiver of a network node in the communications network can operate at a reduced functionality level. At block 1072, the determination is communicated from the first network node to a second network node in the communications network in a (PDU, wherein the DSP of a receiver of a network node that can operate at a reduced functionality level is a DSP of a receiver of one of the first network node and the second network node.

In the examples described above, the values of the DSP parameters are embedded into the header fields of PDUs, however, the values of DSP parameters could be embedded into the payload fields of PDUs, e.g., in the OAM bits. Likewise, control information could be embedded into the header fields of PDUs. In still another embodiment, the values of the DSP parameters and the control information may be shared between the nodes in a different manner.

In an embodiment, OAM bits are used by a node to communicate with a remote node to agree on the timing to start using new values of DSP parameters. In another embodiment, OAM bits are used by a node to communicate with a remote node to agree on reducing the functionality level of the one of the two nodes.

In an embodiment, the elements of the physical layer as shown in FIGS. 4 and 8 can be integrated into an IC device that includes other functionality, such as microprocessor functionality. For example, the components of a traditional PHY chip can be integrated onto a System-on-Chip (SoC).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing operations in a communications network, the method comprising:
    determining, at a first network node in a communications network, that a digital signal processor (DSP) of a receiver of either the first network node or a second network node in the communications network can operate at a reduced functionality level; and
    communicating the determination from the first network node to the second network node in the communications network in a protocol data unit (PDU) via a communications channel between the first network node and the second network node; further comprising:
    determining a value of a DSP parameter for the receiver of the second network node;
    embedding the value of the DSP parameter into a PDU; and
    transmitting the PDU from the first network node to the second network node in the communications network via the communications channel between the first network node and the second network node;
    wherein embedding the value of the DSP parameter into the PDU comprises embedding the value of the DSP parameter into a header field of the PDU.

2. The method of claim 1, wherein the receiver of the first network node and the receiver of the second network node are both capable of receiving data at a data rate of 10 Gbps.

3. The method of claim 2, further comprising reducing the functionality level of the DSP of either the first network node or the second network node after communicating the determination from the first network node to the second network node in the communications network.

4. The method of claim 3, wherein reducing the functionality level of the DSP comprises disabling a digital processing block of the DSP, wherein the digital processing block of the DSP includes at least one digital processing blocks configured for at least one of equalizer functions, echo cancellation functions, automatic gain control (AGC) functions, clock data recovery (CDR) functions, baseline wander (BLW) functions, and data recovery functions.

5. The method of claim 1, wherein communicating the determination from the first network node to the second network node comprises embedding an operations, administration, and management (OAM) word into a payload field of the PDU.

6. The method of claim 1, further comprising, at the second network node:
    receiving the PDU;
    extracting the value of the DSP parameter from the PDU;
    configuring the DSP of the receiver of the second network node using the value of the DSP parameter; and
    operating the DSP of the receiver of the second network node as configured using the value of the DSP parameter.

7. The method of claim 1, further comprising embedding an operations, administration, and management (OAM) word into a payload field of the PDU to communicate information related to the value of the DSP parameter.

8. The method of claim 7, further comprising embedding the OAM word into the PDU at a physical coding sublayer transmitter (PCS-TX) of the first network node and receiving the OAM word at the second network node and extracting the OAM word from the PDU at a physical coding sublayer receiver (PCS-RX) of the second network node.

9. The method of claim 1, wherein determining a value of a DSP parameter comprises computing a value of at least one of an equalizer setting, an echo canceller setting, a clock data recovery (CDR) setting, an automatic gain control (AGC) setting, and a digital baseline wander (BLW) setting.

10. The method of claim 1, wherein determining a value of a DSP parameter comprises reading a DSP management register value of the DSP parameter.

11. The method of claim 1, further comprising embedding an operations, administration, and management (OAM) word into a payload field of a PDU to communicate information related to the value of the DSP parameter.

12. The method of claim 11, further comprising inserting the OAM word into the PDU at a physical coding sublayer transmitter (PCS-TX) of the first network node.

13. A physical layer (PHY) device for a first network node in a communications network, the PHY device comprising:
    a transmitter;
    a receiver that includes a digital signal processor (DSP); and control logic configured to determine that either the DSP of the receiver of the PHY device for the first network node or a DSP of a receiver of a PHY device for a second network node in the communications network can operate at a reduced functionality level and to communicate the determination to the second network node in the communications network in a protocol data unit (PDU) via a communications channel between the first network node and the second network node;

wherein:

the transmitter of the PHY device for the first network node is configured to embed a value of a DSP parameter into a header of a PDU and to embed an operations, administration, and management (OAM) word into the PDU, wherein the OAM word includes information related to the value of the DSP parameter; and the receiver of the PHY device for the first network node is configured to extract a value of a DSP parameter from a header of a received PDU and to extract an OAM word from the received PDU, wherein the OAM word includes information related to the value of the DSP parameter.

14. The PHY device of claim 13, further comprising:

DSP parameter compute logic, which is separate from the DSP, configured to determine the value of the DSP parameter for operating the DSP of the receiver; and DSP parameter reuse logic, which is separate from the DSP, configured to program the DSP with the value of the DSP parameter.

15. The PHY device of claim 14, wherein the DSP parameter compute logic is configured to compute a value of at least one of an equalizer setting, an echo canceller setting, a clock data recovery (CDR) setting, an automatic gain control (AGC) setting, and a digital baseline wander (BLW) setting.

16. A method for performing operations in a communications network, the method comprising:

determining, at a first network node in a communications network, that a digital signal processor (DSP) of a receiver of either the first network node or a second network node in the communications network can operate at a reduced functionality level; and communicating the determination from the first network node to the second network node in the communications network in a protocol data unit (PDU) via a communications channel between the first network node and the second network node, wherein communicating the determination from the first network node to the second network node comprises embedding an operations, administration, and management (OAM) word into a payload field of the PDU at a physical coding sublayer transmitter (PCS-TX) of the first network node.

* * * * *